United States Patent
Choi et al.

(12) 
(10) Patent No.: US 6,619,219 B2
(45) Date of Patent: Sep. 16, 2003

(54) GARLIC UPRIGHT-POSITIONING AND PLANTING DEVICE

(75) Inventors: Duck-Kyu Choi, Suwon (KR); Won-Kyu Park, Kunpo (KR); Tea-Gyoung Kang, Suwon (KR); Seok-Ho Park, Suwon (KR); Hak-Jin Kim, Kunpo (KR); Tae-Yong Kwak, Kunpo (KR); Young-Keun Kim, Suwon (KR)

(73) Assignee: Rural Development Administration, Kyonggi-do (KR)

( * ) Notice: Subject to any disclaimer, the term of this patent is extended or adjusted under 35 U.S.C. 154(b) by 0 days.

(21) Appl. No.: 10/005,975

(22) Filed: Nov. 8, 2001

(65) Prior Publication Data

US 2003/0084830 A1 May 8, 2003

(51) Int. Cl.[7] .................. A01C 11/00; A01C 7/00; A01C 9/00
(52) U.S. Cl. .................. 111/104; 111/77; 111/177
(58) Field of Search .................. 111/100, 101, 111/104, 77, 177

(56) References Cited

U.S. PATENT DOCUMENTS

| | | | | |
|---|---|---|---|---|
| 2,625,122 A | * | 1/1953 | Carelock | 111/115 |
| 3,103,186 A | * | 9/1963 | Saifuku | 111/102 |
| 3,236,199 A | * | 2/1966 | Gray et al. | 111/91 |
| 3,705,559 A | * | 12/1972 | Okorokov et al. | 111/115 |
| 3,872,805 A | * | 3/1975 | Kolk et al. | 111/100 |
| 4,265,368 A | * | 5/1981 | Feltrop | 221/33 |

FOREIGN PATENT DOCUMENTS

| | | | | |
|---|---|---|---|---|
| KR | 1998-48914 B1 | | 6/2000 | |
| KR | 275634 B | * | 12/2000 | A01C/7/00 |
| KR | 1999-32085 B1 | | 3/2001 | |
| KR | 318052 B | * | 12/2001 | A01C/7/08 |

OTHER PUBLICATIONS

W.K. Park et al., "Development of Garlic Clove Planter", ICAME 2000, The Third International Conference On Agricultural Machinery Engineering, Proceedings vol. II of III, pp. 438–445 (Nov. 13, 2000).

* cited by examiner

Primary Examiner—Robert E. Pezzuto
Assistant Examiner—Alicia Torres
(74) Attorney, Agent, or Firm—Akin Gump Strauss Hauer & Feld, L.L.P.

(57) ABSTRACT

A garlic upright-positioning and planting device has a simple structure by which a garlic clove can be planted while the garlic clove is kept at its upright posture with its blunt root portion directed toward the ground. There is provided a garlic planting device for planting garlic cloves while maintaining an upright state, which comprises at least one guiding hopper for guiding a garlic clove with a root portion directed in a downward direction, and a planter for planting the garlic clove supplied from each of the guiding hoppers.

7 Claims, 7 Drawing Sheets

FIG. 1A

*Prior Art*

GARLIC UPRIGHT-POSITIONING AND PLANTING DEVICE

BACKGROUND OF THE INVENTION

1. Field of the Invention

The present invention relates to a planting device of a garlic clove planter for planting garlic cloves, and more particularly, to a garlic upright-positioning and planting device for planting garlic cloves while maintaining an upright state thereof at the time of planting the garlic cloves.

2. Description of the Prior Art

In general, operations for planting garlic are performed by transporting garlic cloves to a planting field, making furrows for planting the transported garlic cloves, planting the garlic cloves into the furrows, and covering the furrows. Heretofore, such garlic planting operations have been conducted by manual works that need tremendous human labors.

There were problems in that more time and expenses were required for the garlic planting operations conducted by the manual works. Thus, the applicant developed the garlic clove planter capable of overcoming the above problems and filed patent applications with the Korean Intellectual Property Office (see Korean Patent Application Nos. 1998-48914 and 1999-32085).

Figure 1A:
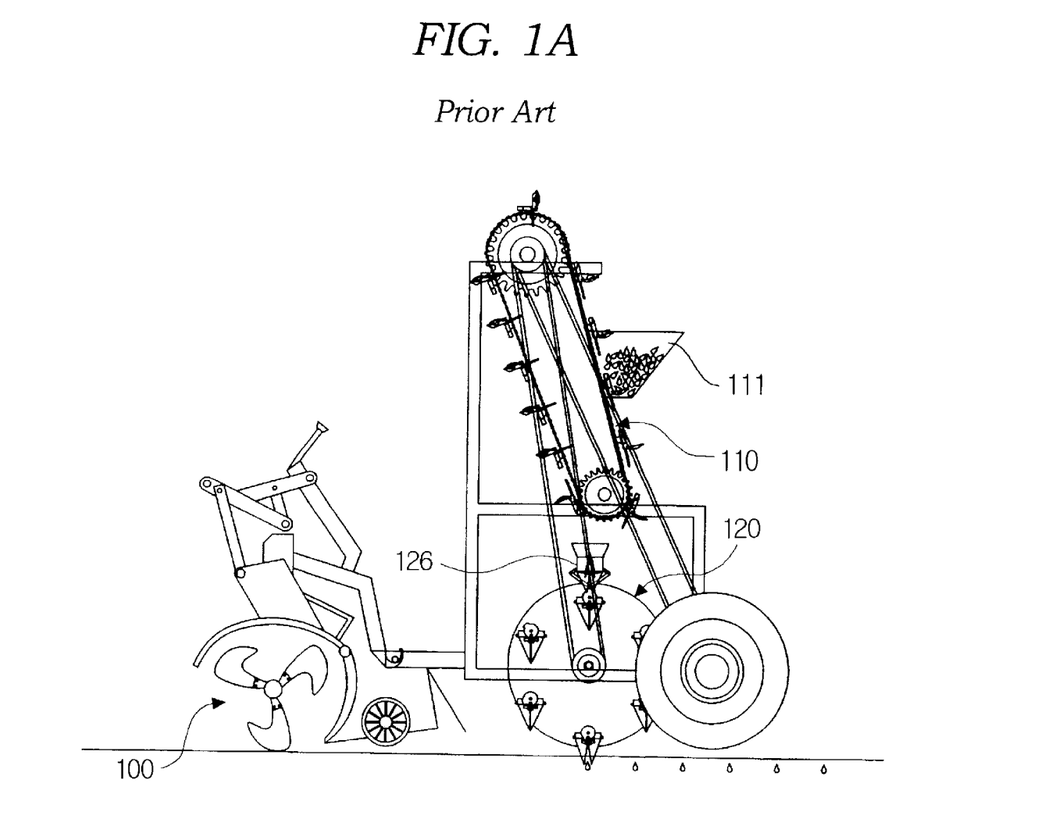
FIG. 1A is an overall schematic view showing the whole constitution of a conventional garlic clove planter.

FIG. 1A schematically shows the whole constitution of a conventional garlic clove planter disclosed in Korean Patent Application No. 1999-32085. The garlic clove planter shown in FIG. 1A is now widely used. The garlic clove planter comprises a digging device 100 for digging and preparing the soil, in which garlic cloves will be planted, using the power transmitted from a power mechanism (not shown) such as a tractor or cultivator; a transport device 110 for seating the garlic clove from a clove storage hopper 111, in which the garlic cloves are contained, one after another and transferring the seated garlic clove using rotational force transmitted from the power mechanism; and a planting device 120 for guiding the garlic clove transferred from the transport device 110 to be postured in an upright position perpendicular to the ground and sequentially planting the garlic clove one after another.

Figure 1B:
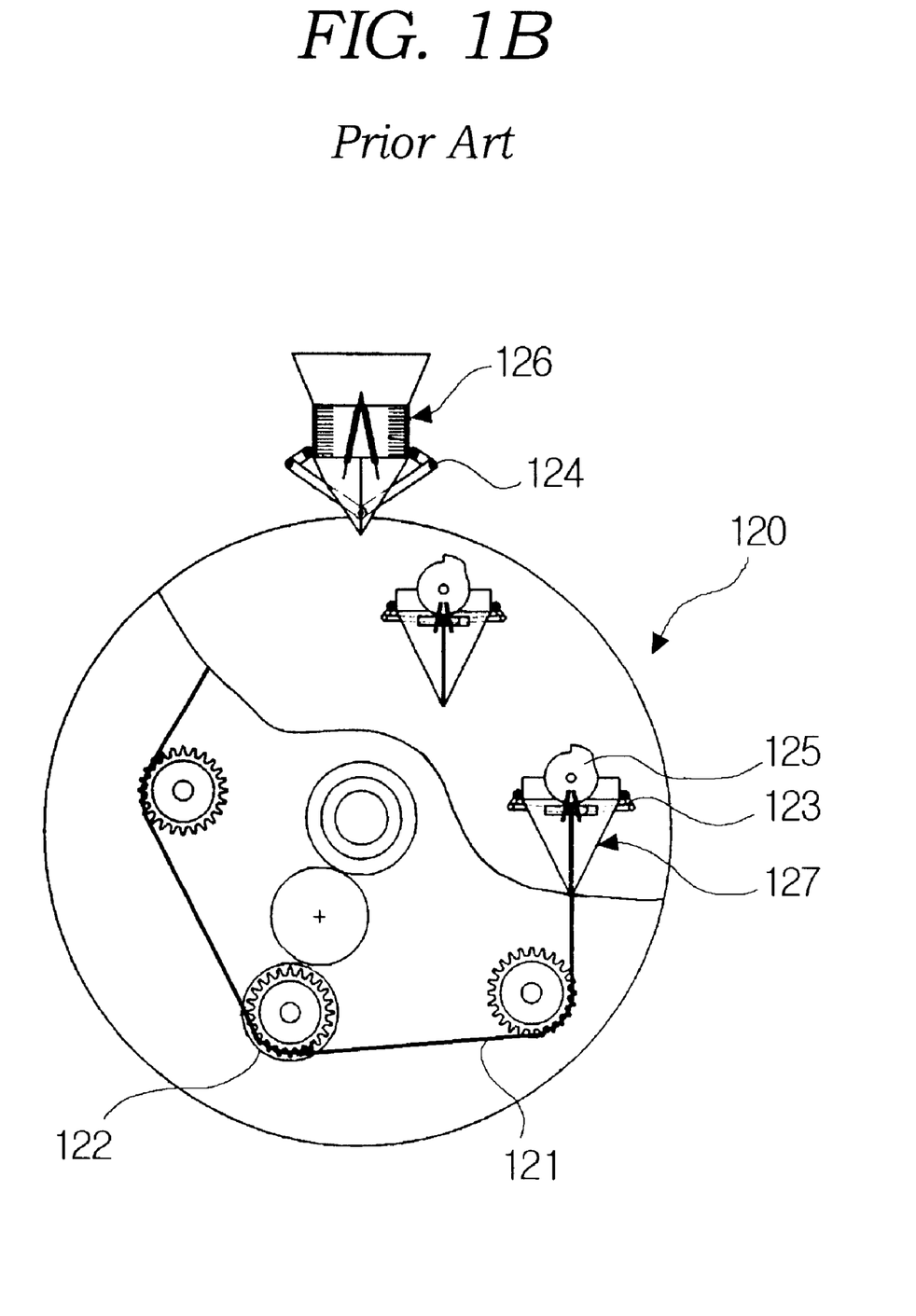
FIG. 1B is a schematic view showing the coupled and operational state among respective components of a conventional garlic upright-positioning and planting device.

As shown in FIG. 1B, the conventional garlic planting device 120 is constructed to allow a guiding hopper 126 and planting hoppers 127 to be opened and closed through multi-component link mechanisms 123, 124 and sector cams 125 by providing reverse driving force through a plurality of driven gears 122 which are engaged with one another by a driving chain 121.

However, the conventional garlic planting device has a complicated structure in which a posture of the planting hopper is maintained through the plurality of driven gears engaged with one another by the driving chain.

Further, the conventional garlic planting device has a complicated structure in which in order to open the guiding hopper, a link mechanism of the guiding hopper and the sector cams of the planting hoppers are interlocked with one another.

Furthermore, the conventional garlic planting device has a complicated structure in which the planting hoppers are opened and closed by interlocking operation of their respective sector cams and link mechanisms.

BRIEF SUMMARY OF THE INVENTION

Therefore, the present invention is conceived to solve the aforementioned problems in the prior art. An object of the present invention is to provide a garlic upright-positioning and planting device having a simple structure by which a garlic clove can be planted while the garlic clove is kept at its upright posture with a blunt root portion thereof directed toward the ground.

According to an aspect of the present invention for achieving the object, there is provided a garlic planting device for planting garlic cloves while maintaining an upright state thereof, which comprises at least one guiding hopper for guiding a garlic clove with a root portion thereof directed in a downward direction, and a planting means for planting the garlic clove supplied from each of the guiding hoppers. The planting means further comprises a pair of round planting plates rotatably supported at both ends of a fixed shaft; a driving sprocket fixedly coupled on an external surface of one of the planting plates for transmitting driving force from an external power source to the planting plates; a plurality of driven shafts disposed at an equiangular interval between the pair of the planting plates; a plurality of planting hoppers fixed respectively to the plurality of the driven shafts for planting the garlic clove supplied from the guiding hoppers; a sector cam fixed to one side of the fixed shaft for causing the planting hoppers to be opened and closed; and a reverse drive mechanism which is disposed in at least one of the pair of the planting plates and causes the driven shafts to be rotated in a direction opposite to a direction the planting plates rotate such that lower portions of the planting hoppers are always directed toward the ground even though the planting plates rotate.

BRIEF DESCRIPTION OF THE SEVERAL VIEWS OF THE DRAWINGS

The above object and feature of the present invention will become apparent from the following description of a preferred embodiment given in connection with the accompanying drawings, in which.

DETAILED DESCRIPTION OF THE INVENTION

Hereinafter, a preferred embodiment of the present invention will be described in detail with reference to the accompanying drawings.

Figure 2:
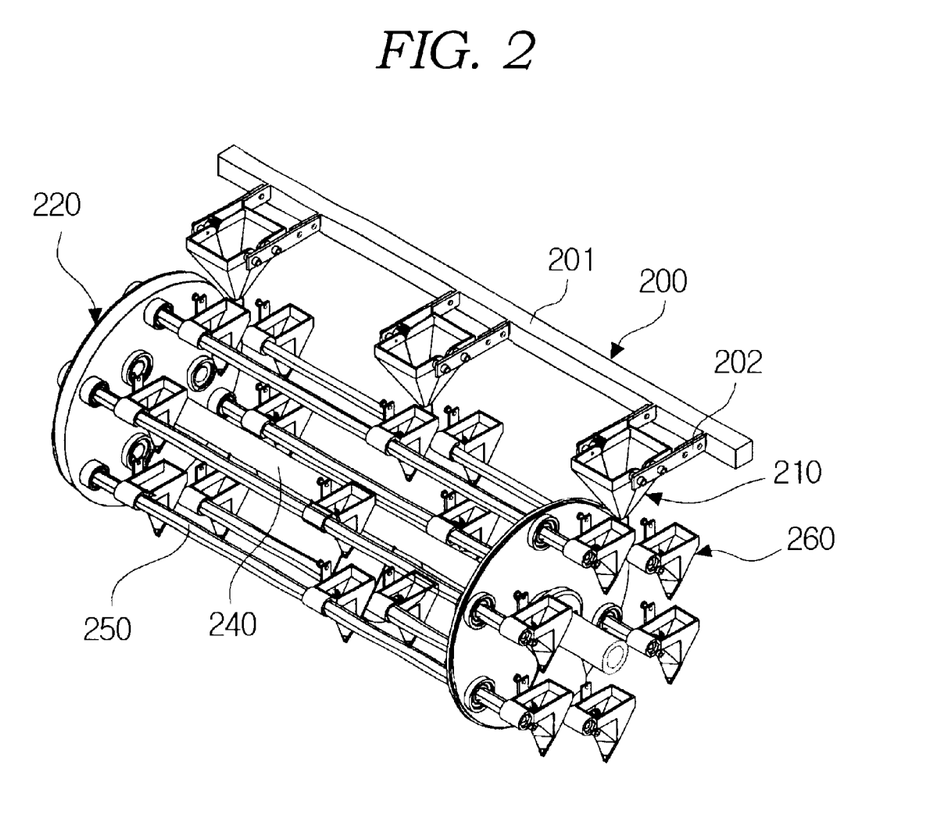
FIG. 2 is an overall schematic view of a garlic upright-positioning and planting device according to a preferred embodiment of the present invention.

FIG. 2 is an overall perspective view of a garlic upright-positioning and planting device according to a preferred embodiment of the present invention. The garlic upright-positioning and planting device shown in FIG. 2 is constructed to be generally used in the conventional garlic clove planter as shown in FIG. 1A.

As shown in FIG. 2, the garlic upright-positioning and planting device 200 is constructed to include a guiding means for guiding a garlic clove to be transferred in an upright state, i.e. with a blunt root portion thereof directed downwardly, and a planting means mounted to a lower part of the guiding means for planting the upright guided garlic clove.

The guiding means comprises a plurality of guiding hoppers 210 which are fixed to a supporting rod 201 secured to a main body (not shown) of the garlic clove planter, respectively, at predetermined intervals in a longitudinal direction of the supporting rod.

Further, the planting means comprises a pair of round planting plates 220 which are positioned with a space disposed therebetween, a driving sprocket 230 which receives driving force from an external power source and is coupled at the center of one of the planting plates 220, a fixed shaft 240 which connects the centers of the planting plates 220 with each other, and a plurality of driven shafts 250 which are disposed at an equiangular interval to connect the planting plates 220 with each other. Furthermore, the planting means comprises a plurality of planting hoppers 260 which are fixed to the plurality of driven shafts 250, respectively, to be positioned below the plurality of guiding hoppers 210, and a reverse drive mechanism which is disposed in the planting plate 220 with the driving sprocket 230 coupled therewith and causes the planting hoppers to be rotated in a reverse direction in response to rotation of the planting plates 220 such that lower portions of the planting hoppers 260 are always directed toward the ground even if the planting plates 220 rotate.

Figure 3:
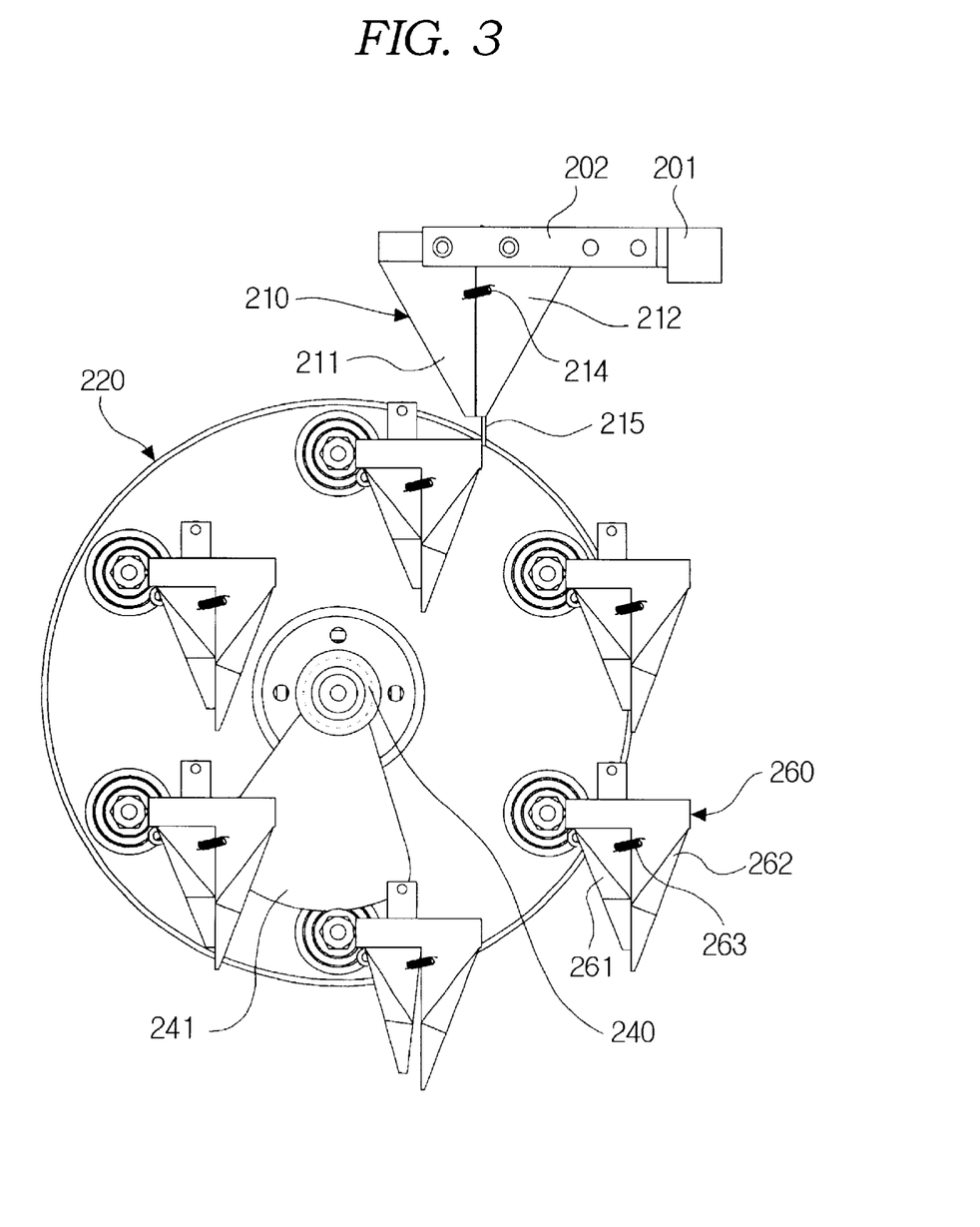
FIG. 3 is a right side view of the garlic upright-positioning and planting device shown in FIG. 2.
Figure 4:
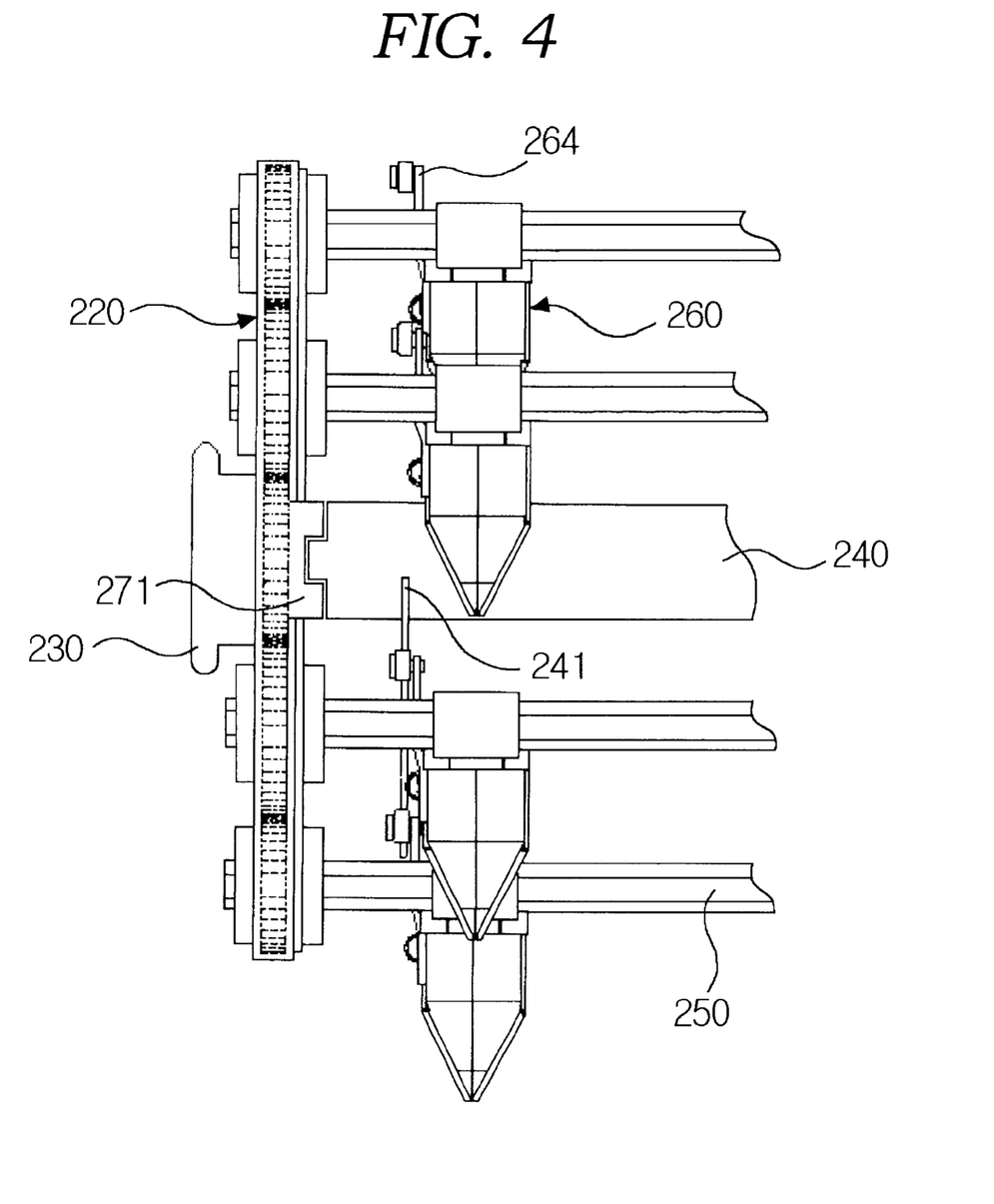
FIG. 4 is a partial front view of the garlic upright-positioning and planting device shown in FIG. 2.

FIG. 3 is a right side view of the garlic upright-positioning and planting device shown in FIG. 2, and FIG. 4 is a partial front view of the garlic upright-positioning and planting device shown in FIG. 2.

As shown in FIGS. 2 and 3, each of the guiding hoppers 210 of the present invention includes two halves 211, 212 and is fixed to the supporting rod 201 through supporting portions 202 secured thereto. The two halves 211, 212 are constructed in such a manner that lower portions of the guiding hoppers are opened through a pair of sector gears 213 engaged with each other and again closed by restoring force of a tension spring 214 connected with two halves 211, 212 (see FIG. 6A). The guiding hopper 210 has open upper and lower portions. The open upper portion of the guiding hopper is formed to have such a size that the garlic clove can be sufficiently introduced into the hopper. The lower portion of the guiding hopper is formed with a round slot having such a size that a pointed sprouting bract portion of the garlic clove can protrude toward the outside but the blunt root portion of the garlic clove cannot protrude therethrough. Further, a downward protruding portion 215 having a predetermined length is formed at an end of the half 212 of the guiding hopper 210.

As shown in FIGS. 3 and 4, the fixed shaft 240 is secured to a fixing stand (not shown) of the main body of the garlic clove planter, and a sector cam 241 having a predetermined size is then fixed to one side of the fixed shaft 240.

Each of the planting hoppers 260 serves to plant the garlic clove, which is guided thereinto and supplied thereto through the guiding hopper 210, into the ground, as shown in FIGS. 2 to 4. Further, one side of the planting hopper is fixed to the relevant driven shaft 250 such that the planting hopper is positioned vertically right below the guiding hopper 210. At this time, a plurality of the planting hoppers 260 are fixed to the relevant driven shaft 250 at an equidistant interval in a longitudinal direction of the driven shaft. Furthermore, the protruding portion 215 of the guiding hopper 210 is positioned below an upper end of each planting hopper 260 when the upper end comes into contact with the protruding portion. Therefore, the right upper end of the planting hopper 260 advances while pushing the protruding portion 215 as the planting plate 220 rotates. Consequently, the garlic clove seated in the guiding hopper 210 can fall into the relevant planting hopper 260.

Further, each planting hopper 260 has an open upper portion, and a movable half 261 for discharging the garlic clove at a lower portion of the planting hopper. The movable half 261 is hinged to a fixed half 262 to be opened and closed with respect to the fixed half 262. The movable half 261 is constructed to be automatically closed by means of restoring force of a tension spring 263 connected with the fixed half 262. Moreover, a roller 264 is connected to an upward extension of the movable half 261 (see FIG. 4). The roller 264 is positioned on one side of the planting hopper 260. That is, the planting hopper 260 is constructed such that the movable half 261 is opened when predetermined force generated by the sector cam 241 secured to the fixed shaft 240 is applied to the roller 264 and the planting hopper is then returned to an original position by means of the restoring force of the tension spring 263 when the predetermined force is removed.

Furthermore, it is preferred that the planting hopper 260 be constructed in such a manner that the distal end of the fixed half 262 of the planting hopper 260 extends further below that of the movable half 261. Such construction ensures that the garlic clove can be planted in the upright state while the fixed half 262 of the planting hopper 260 coming close to the ground by means of rotation of the planting plate 220 makes grooves on the ground and the movable half 261, which is opened and simultaneously lifted in proportion to an advancing speed of the planter, does not touch the garlic clove to be planted into the grooves (see FIG. 3).

Figure 5:
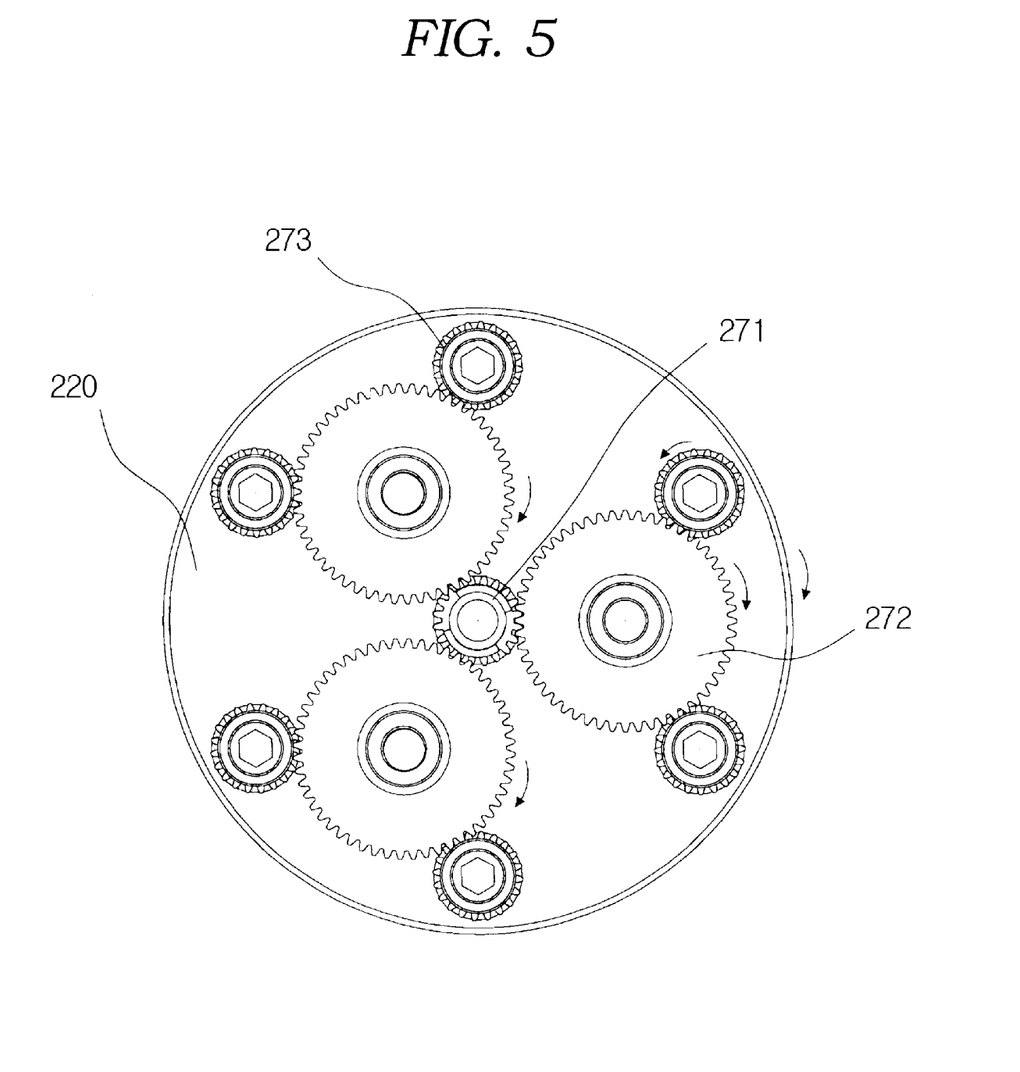
FIG. 5 is a cut-away view illustrating an operating principle of the garlic upright-positioning and planting device shown in FIG. 2.

FIG. 5 is a cut-away view showing the operating principle of the garlic upright-positioning and planting device shown in FIG. 2. As shown in FIGS. 2 to 5, a reverse drive mechanism of the present invention is placed in the center of the planting plate 220, and includes a stationary gear 271 secured in a fixed position regardless of the rotation of the planting plate 220, three idle gears 272 engaged with the stationary gear 271, and pairs of driven gears 273 respectively engaged with relevant idle gears 272 and having the same gear ratio as the stationary gear 271.

The stationary gear 271 is coupled with the fixed shaft 240 secured to a fixing stand to be kept stationary regardless of the rotation of the planting plate 220. In addition, each of the idle gears 272 is rotatably secured in the planting plate 220, so that it rotates together with the stationary gear 271 in the same rotating direction as the planting plate 220.

Each of the driven gears 273 is also rotatably secured in the planting plate 220, so that it rotates through the engagement with the idle gear in a direction opposite to the rotating direction of the planting plate 220. The driven gear 273 is coupled with the driven shaft 250 to which the planting hopper 260 is secured. With the reverse drive mechanism constructed as such, even though the planting plate 220 rotates, the lower portion of the planting hopper 260 is always directed to the ground.

Figure 6A:
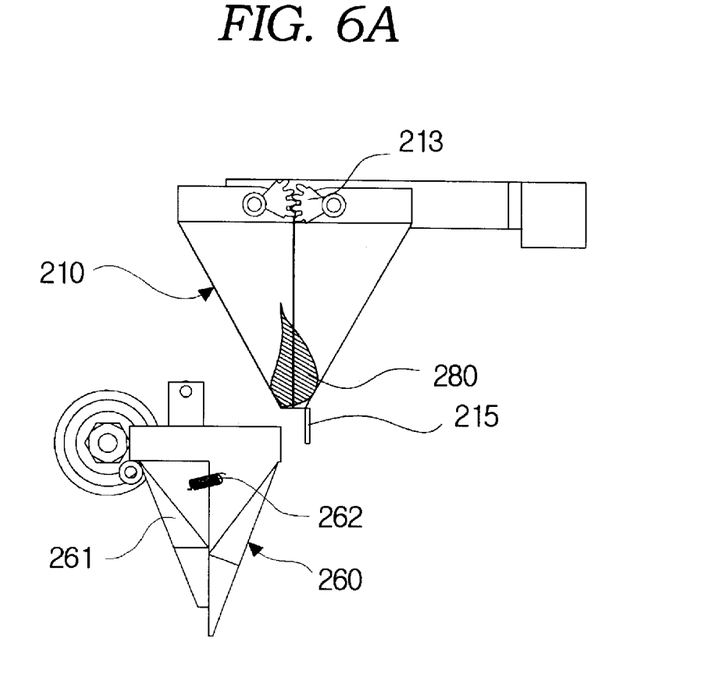
FIGS. 6A and 6B are conceptual views illustrating a principle of upright positioning the garlic clove in the garlic upright-positioning and planting device shown in FIG. 2.
Figure 6B:
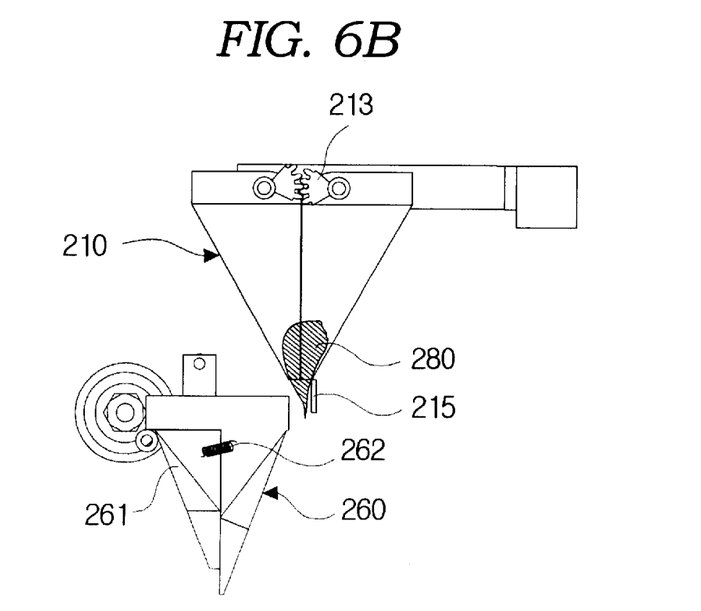

FIGS. 6A and 6B are conceptual views showing the principle of positioning the garlic cloves in the upright state in the garlic upright-positioning and planting device shown in FIG. 2. FIG. 6A shows the state where the garlic clove 280 is seated in the guiding hopper 210 with the blunt root portion of the garlic clove 280 directed downward. FIG. 6B shows the inverted state where the garlic clove 280 is seated in the guiding hopper 210 with the pointed sprouting bract portion of the garlic clove 280 directed downward.

If the planting hopper 260 rotates under the condition that the garlic clove 280 is seated in the guiding hopper 210 in the upright state as shown in FIG. 6A, a right upper end of the planting hopper 260 pushes the downward protruding portion 215 and opens the guiding hopper 210 so that the garlic clove 280 falls into the planting hopper 260 in the upright state. However, if planting hopper 260 rotates under the condition that the garlic clove 280 is seated in the guiding hopper 210 in the inverted state where the bract portion of the garlic clove 280 protrudes outward as shown in FIG. 6A, the right upper end of the planting hopper 260 pushes the bract portion of the garlic clove 280 and opens the guiding hopper 210. Accordingly, the garlic clove 280 rotates 180 degrees about the bract portion thereof and then falls into the planting hopper 260 in the correct upright state.

Hereinafter, the operational relationship of the garlic upright-positioning and planting device constructed as described above will be explained in detail.

As shown in FIGS. 2 to 5, the planting plate 220 rotates as the driving sprocket 230 rotates by means of driving force transmitted from an external power source, and the idle gear 272 placed in the planting plate 220 rotates in the same rotation direction as the planting plate 220. Further, the driven gear 273 engaged with the idle gear 272 rotates in the direction opposite to the rotation direction of the planting plate 220. Thus, although the planting hopper 260 secured to the driven shaft 250 rotates in the same rotation direction as the planting plate 220, the lower portion of the planting hopper 260 is always directed toward the ground.

At this time, the planting hopper 260 rotates while the right upper end thereof pushes the downward protruding portion 215 of the guiding hopper 210. Then, as shown in FIGS. 6a and 6b, the lower portion of the guiding hopper 210 is opened in opposite directions by the sector gear 213. Subsequently, the garlic clove 280 seated in the guiding hopper 210 falls into the planting hopper 260 in the upright state regardless of a posture of the garlic clove. After the garlic clove 280 is discharged in such way, the guiding hopper 210 is automatically closed by the restoring force of the tension spring 214.

The planting hopper 260 with the garlic clove 280 seated in the upright state therein continuously rotates, and then, the fixed half 262 makes the grooves when coming into contact with the ground. Thereafter, the roller 264 of the planting hopper 260 comes into contact with the sector cam 241 secured to the fixed shaft 240, and thus the movable half 261 is opened. The garlic clove 280 discharged through the movable half 261 is planted in the upright state into the grooves. After the garlic clove 280 has been discharged in such way, the movable half 261 of the planting hopper 260 is closed by the restoring force of the tension spring 263.

According to a series of planting processes, the garlic clove is planted in the upright state.

As described above, the garlic upright-positioning and planting device of the present invention has a simple structure in which a driving chain is eliminated and the posture of the planting hopper is maintained by one stationary gear and the plurality of driven gears.

Further, the garlic upright-positioning and planting device of the present invention has a simple structure in which an exclusive link mechanism for the guiding hopper is eliminated, the guiding hopper is interlocked with the planting hopper to be opened, and even if the root portion of the garlic clove has been inverted, this posture of the garlic clove can be corrected just before the garlic clove falls into the planting hopper.

Moreover, the garlic upright-positioning and planting device of the present invention has a simple structure in which a cam and link mechanism is eliminated in the planting hopper and is replaced with the sector cam.

Although the technical details of the garlic upright-positioning and planting device of the present invention have been described above with reference to the accompanying drawings, they illustrate the most preferred embodiment of the present invention only by way of example. Thus, the present invention is not limited thereto.

While the invention has been shown and described with respect to the preferred embodiment, it will be understood by those skilled in the art that various changes and modifications may be made without departing from the spirit and scope of the invention as defined in the following claims.

What is claimed is:

1. A garlic planting device, comprising:
   at least one guiding hopper for guiding a garlic clove with a root portion thereof directed in a downward direction; and
   a planting means for planting said garlic clove supplied from each of said guiding hoppers;
   wherein said planting means comprises a pair of round planting plates rotatably supported at both ends of a fixed shaft; a driving sprocket fixedly coupled on an external surface of one of said planting plates for transmitting driving force from an external power source to said planting plates; a plurality of driven shafts disposed at an equiangular interval between the pair of said planting plates; a plurality of planting hoppers fixed respectively to the plurality of said driven shafts for planting said garlic clove supplied from said guiding hoppers; a sector cam fixed to one side of said fixed shaft for causing said planting hoppers to be opened and closed; and a reverse drive mechanism which is disposed within at least one of the pair of said planting plates and causes said driven shafts to be rotated in a direction opposite to a direction in which said planting plates rotate such that lower portions of said planting hoppers are always directed toward the ground even if said planting plates rotate, said reverse drive mechanism comprises a stationary gear which is disposed in the center of at least one of said planting plates and coupled with said fixed shaft; a plurality of idle gears engaged with said stationary gear; and a plurality of driven gears which are engaged respectively with the plurality of said idle gears, have the same gear ratio as said stationary gear, and are then engaged respectively with the plurality of said driven shafts.

2. The garlic planting device as claimed in claim 1, wherein said guiding hopper includes a pair of halves which can be opened and closed by a pair of sector gears, and a tension spring for pulling said two halves toward each other to close said two halves at ordinary times, and one of said two halves in integrally formed with a downward protruding portion at a lower end thereof.

3. The garlic planting device as claimed in claim 2, wherein said guiding hopper has open upper and lower portions, and said lower portion is formed with a round slot having such a size that a pointed bract portion of said garlic clove can protrude toward the outside but a blunt root portion of said garlic clove cannot protrude toward the outside.

4. The garlic planting device as claimed in claim 1, wherein said stationary gear is engaged with three idle gears, and each of said three idle gears is engaged with two driven gears.

5. The garlic planting device as claimed in claim 1, wherein a plurality of said planting hoppers are fixed to each of the plurality of said driven shafts at an equiangular interval in a longitudinal direction of said driven shaft.

6. A garlic planting device, comprising:

at least one guiding hopper for guiding a garlic clove with a root portion thereof directed in a downward direction; and a planting means for planting said garlic clove supplied from each of said guiding hoppers;

wherein said planting means comprises a pair of round planting plates rotatably supported at both ends of a fixed shaft; a driving sprocket fixedly coupled on an external surface of one of said planting plates for transmitting driving force from an external power source to said planting plates; a plurality of driven shafts disposed at an equiangular interval between the pair of said planting plates; a plurality of planting hoppers fixed respectively to the plurality of said driven shafts for planting said garlic clove supplied from said guiding hoppers; a sector cam fixed to one side of said fixed shaft for causing said planting hoppers to be opened and closed; and a reverse drive mechanism which is disposed within at least one of the pair of said planting plates and causes said driven shafts to be rotated in a direction opposite to a direction in which said planting plates rotate such that lower portions of said planting hoppers are always directed toward the ground even if said planting plates rotate, wherein each of said planting hoppers comprises a fixed half with an upper portion thereof opened and with one side thereof fixedly coupled with said driven shaft, a movable half which is coupled with said fixed half such that a lower end can be opened and closed with respect to said fixed half and which is formed with a roller at an upper end thereof, and a tension spring for connecting said fixed and movable halves with each other.

7. The garlic planting device as claimed in claim 6, wherein a tip end of said fixed half extends further below a distal end of said movable half.

* * * * *